(12) United States Patent
Russo

(10) Patent No.: US 7,654,072 B2
(45) Date of Patent: Feb. 2, 2010

(54) METHOD AND APPARATUS FOR GENERATING COMPRESSED AIR FROM LIQUEFIED AIR, FOR SUPPLYING COMPRESSED AIR TO AN ENGINE

(75) Inventor: Vitaliano Russo, Milan (IT)

(73) Assignee: Sincron S.r.l. (IT)

( * ) Notice: Subject to any disclaimer, the term of this patent is extended or adjusted under 35 U.S.C. 154(b) by 382 days.

(21) Appl. No.: 10/561,077

(22) PCT Filed: Jun. 15, 2004

(86) PCT No.: PCT/EP2004/006435

§ 371 (c)(1),
(2), (4) Date: Jan. 31, 2007

(87) PCT Pub. No.: WO2004/111527

PCT Pub. Date: Dec. 23, 2004

(65) Prior Publication Data

US 2007/0193275 A1  Aug. 23, 2007

(30) Foreign Application Priority Data

Jun. 16, 2003  (EP) ................... 03425392
Dec. 4, 2003   (EP) ................... 03425780

(51) Int. Cl.
*F02B 43/00* (2006.01)
*F02B 41/00* (2006.01)
*F02G 3/02* (2006.01)

(52) U.S. Cl. .............. 60/39.01; 60/39.12; 60/39.48; 60/651

(58) Field of Classification Search ............. 60/39.01, 60/39.12, 39.48, 651, 671, 673, 679
See application file for complete search history.

(56) References Cited

U.S. PATENT DOCUMENTS 3,704,760 A  12/1972  Maruyama (Continued)

FOREIGN PATENT DOCUMENTS

| DE | 199 11 321 A1 | 9/2000 |
| EP | 1 489 347 A1 | 12/2004 |
| FR | 2 814 530 A | 3/2002 |
| GB | 1 454 128 | 10/1976 |
| GB | 1 458 560 A | 12/1976 |

*Primary Examiner*—Erick Solis
(74) *Attorney, Agent, or Firm*—Akerman Senterfitt

(57) ABSTRACT

An engine unit, particularly for urban transport, comprising an engine (3) supplied with a compressed gas and having a expansion chamber (9), a liquid gas tank (28) in communication with the engine (3), and means (M, M') for gasifying the liquid gas, which are interposed between the liquid gas tank (28) and the engine (3) for obtaining compressed gas. The gasifying means (M) comprise a gasification chamber (22) in communication with the liquid gas tank (28) and a liquid fuel tank (39) which is connected to the gasification chamber (22). The gasification chamber (22) is in fluid communication with both the liquid fuel tank (39) for the combustion of the liquid fuel with the oxygen of the liquid gas (22), and the expansion chamber (9) so that the compressed liquid gas and gaseous products of combustion process are used to do useful work.

22 Claims, 5 Drawing Sheets

U.S. PATENT DOCUMENTS 3,886,733 A    6/1975  Connell
4,359,118 A   11/1982  Latter et al.
6,170,264 B1 * 1/2001  Viteri et al. .................. 60/671
2002/0178724 A1 * 12/2002 Hunt ........................... 60/649
2004/0003592 A1 *  1/2004 Viteri et al. ................... 60/651
2007/0169461 A1 *  7/2007 Koerner ..................... 60/39.12

* cited by examiner

12 # METHOD AND APPARATUS FOR GENERATING COMPRESSED AIR FROM LIQUEFIED AIR, FOR SUPPLYING COMPRESSED AIR TO AN ENGINE

FIELD OF APPLICATION

The present invention relates to an engine unit, particularly, but not limited to urban traction, as defined in the preamble of the attached Claim 1.

As it is known, particularly in the field of urban traction, which is in the field of both public and commercial transport as well as of private transport in the urban network, there is the need of environmentally friendly vehicles, in practice non polluting. So, the invention is particularly intended for vehicles such as taxis, urban buses, as well as engines for industrial factories, such as self-propelling machines in general, i.e. in railway stations, obviously besides private vehicles for prevailing urban use.

PRIOR ART

Vehicles have been proposed equipped with an engine unit wherein a compressed air tank is in fluid communication with an engine supplied with the compressed air. These vehicles are really less polluting but suffer from the well known drawback of scarce autonomy. Moreover, also their efficiency is low, because the initial pressure of the compressed air is too high for use in the engine and must be reduced, with loss of energy and further reduction of autonomy.

It has been proposed to store energy in the form of a cold liquefied gas, such as liquid nitrogen. This technology provides the steps of gasifying the cold liquid obtaining compressed gas, and expanding compressed gas from high pressure to atmospheric pressure in an appropriate engine expander to do useful work.

An engine operating with liquefied gases as principal energy sources is disclosed for instance in the U.S. Pat. No 4,359,118, whereon the preamble of claim 1 is based. This patent relates to a composite engine cycle, wherein liquefied gas, such as liquid air or liquid nitrogen, is expanded and warmed both from the ambient and by combustion of suitable fuels.

Although the prior art engine does have favourable features including reduced dependence on liquid fossil fuel, no long distance transportation problems, and wide variety of usable fuels, it suffers however from one or more limitations, which make it non entirely suitable for its intended purpose.

The main drawback is that neither an optimal efficiency nor low pollutant levels can be achieved.

Therefore, there exists the need of an engine unit, that, having the same favourable features of the known engine, also ensures high level efficiency and low pollutant levels. The underlying problem of this invention is to provide an engine unit, which satisfies the above-specified need, simultaneously overcoming the afore-mentioned drawback with reference to prior art.

This problem is solved by an engine unit as defined in the attached Claim 1.

The term liquid gas means, in the field of the present invention, a substance or a mixture of substances, which, under normal conditions, i.e. substantially at ambient temperature and pressure, is in the gas phase, whereas in the above tank under suitable conditions of high pressure and low temperature, is in the liquid phase.

DETAILED DESCRIPTION OF THE INVENTION

Figure 1:
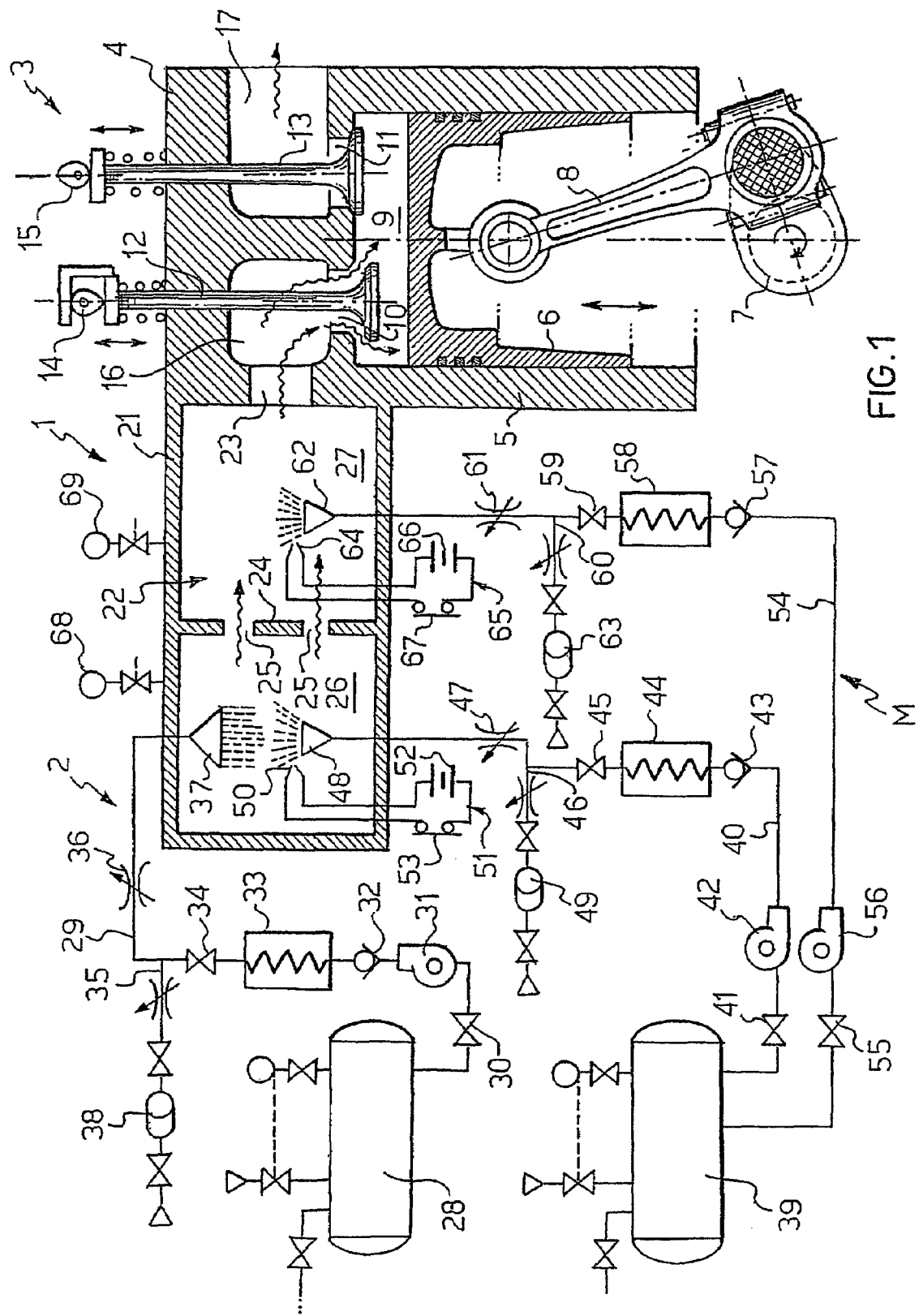
FIG. 1 shows a schematic view of an engine unit according to the invention.
Figure 2:
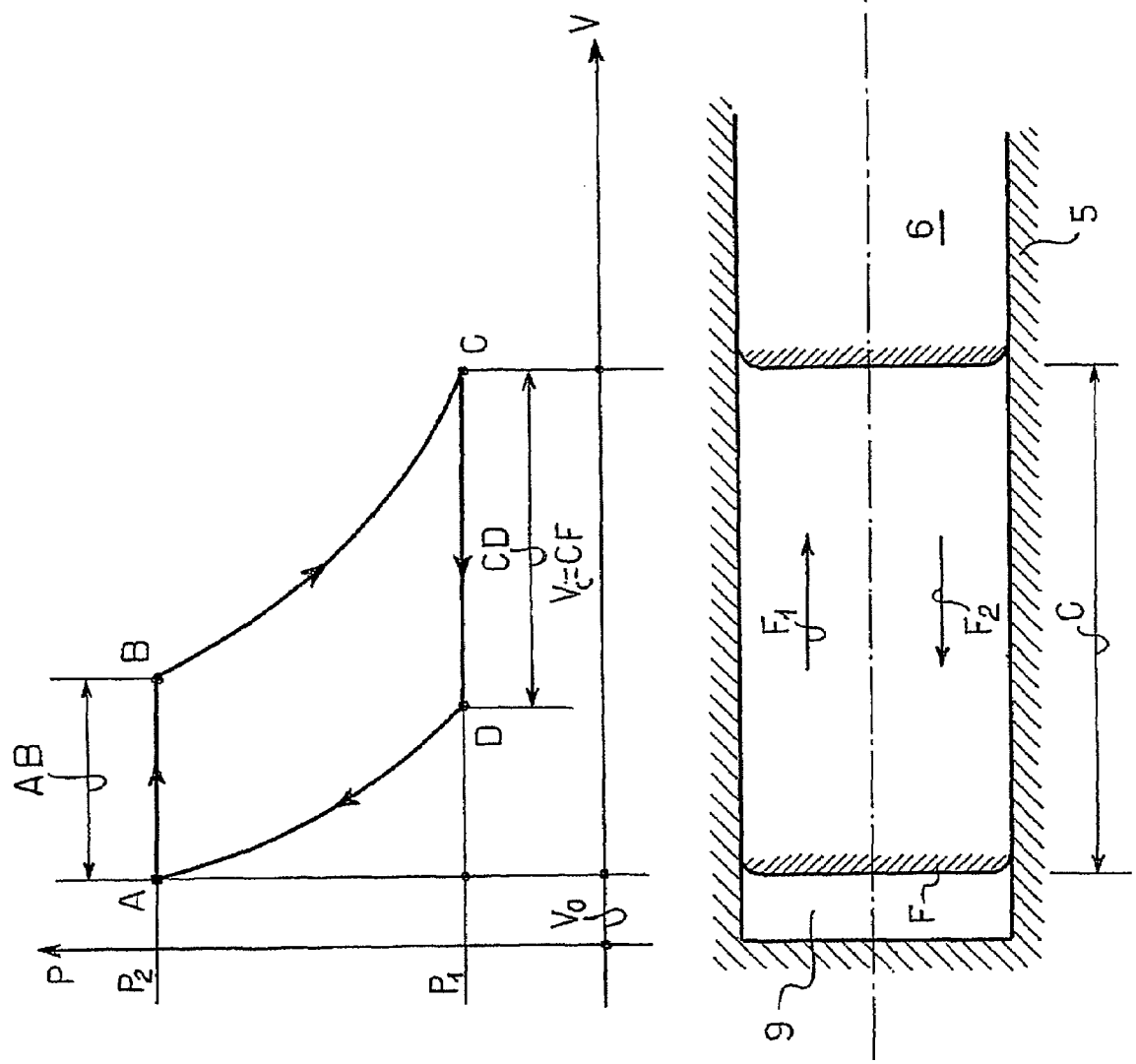
FIG. 2 shows an operation diagram of the trend of the pressure according to the volume.

With reference to FIGS. 1 and 2, 1 globally indicates a first embodiment of an engine unit according to the invention. The engine unit 1, mounted on board of a vehicle particularly indicated for urban transport, comprises a compressed gas generator 2 and an engine 3, supplied with the compressed gas from the generator 2.

The engine 3, in the example, is an engine of the alternative type, that is a piston engine. The engine 3 is represented, in the drawing, limitedly to a monoblock 4, a cylinder 5 of a plurality of cylinders, a piston 6 movable within the cylinder 5, in order to transmit motion to a crankshaft 7 through a rod 8, an expansion chamber 9 defined within the cylinder 5, as well as intake and exhaust ducts 10, 11, so as to put into fluid communication the expansion chamber 9 with intake and exhaust manifolds 16 and 17, through respective intake and exhaust valves 12, 13, which are driven to open by respective cams 14, 15 and to close either by springs or desmodromically.

The compressed gas generator 2 comprises a close housing 21 wherein a gasification chamber 22 is formed. The gasification chamber 22 is in fluid communication with the intake manifold 16 through a port 23, and further with the expansion chamber 9 through the intake duct 10.

Preferably, the gasification chamber 22 is split, because of a wall 24 provided with perforations 25 being in the housing 21, into a first saturated-steam combustion chamber 26 and a second, overheated combustion chamber 27 facing the port 23.

In the specific case of FIG. 1, liquid air is used as liquid gas and the compressed gas generator 2 comprises a liquid air tank 28, in practice a liquid air cryogenic cylinder.

The gasification chamber 22, and precisely the first chamber 26, is connected to the liquid air tank 28 through a piping 29. Along the piping 29, starting from the tank 28, a cutoff valve 30, a pump 31, a check valve 32, a heat exchanger 33, a cutoff valve 34, a branch line 35, and a flow control valve 36 are arranged, and finally a diffuser 37 open in the first chamber is arranged at the end of the piping. The branch line 35 is provided with a settable accumulator 38.

In order to gasify liquid air, the compressed air generator 2 comprises gasifying means M, which include a tank for liquid fuel 39. The liquid fuel may be liquid methane or another hydrocarbon, but preferably liquid hydrogen is used, in practice a cryogenic cylinder of liquid hydrogen.

The gasification chamber 22, and precisely the first chamber 26, is connected to the liquid hydrogen tank 39 through a piping 40. Along the piping 40, starting from the tank 39, a cutoff valve 41, a pump 42, a check valve 43, a heat exchanger 44, a cutoff valve 45, a branch line 46, a flow control valve 47 and finally a diffuser 48, open in the first chamber and facing the diffuser 37, are arranged. The branch line 46 is provided with a settable accumulator 49.

The first chamber 26 is provided with a pilot igniter 50 facing the diffuser 48. The pilot igniter 50 is supplied by an electric circuit 51, which comprises power source 52 and switch 53.

The gasification chamber 22, and precisely the second chamber 27, is connected to the liquid hydrogen tank 39 through a piping 54. Along the piping 54, substantially as already described for piping 40, a cutoff valve 55, a pump 56, a check valve 57, a heat exchanger 58, a cutoff valve 59, a branch line 60, a flow control valve 61 and finally a diffuser 62 are arranged. The branch line 60 is provided with a settable accumulator 63. Also the second chamber 27 is provided with a pilot igniter 64. This igniter faces the diffuser 62 and it is supplied by an electric circuit 65 comprising power source 66 and switch 67.

The power sources 52 and 66, in practice a conventional battery, are conventionally rechargeable through a dynamo, not shown, driven by the engine.

The accumulators 38, 49 and 63 are conventional ones and are provided with fill and cutoff valves, and a throttle.

Also tanks 28 and 39 are conventional and they are both provided with vent, fill valve and pressure gauge, with respective cutoff valves.

Pressure gauges 68, 69 and, preferably, pressure transducers, are provided on each chamber 26 and 27.

In operation, the air and the hydrogen from the respective tanks 28 and 39 are forced by respective pumps 31 and 42 to diffuse into the gasification chamber 22 and precisely the first chamber 26 and they reach mutual contact. Due to the pilot igniter 50, combustion of the hydrogen with part of the air and more exactly with the oxygen of a part thereof takes place. This combustion takes place under saturated-steam conditions: actually the first chamber 26 now contains oxygen-depleted air and saturated steam, both under the same pressure, substantially between 10 and 30 atmospheres, and preferably 20 atmospheres.

These gases pass from the first chamber 26 to the second chamber 27 through the perforations 25 of the wall 24.

The combustion continues in the second chamber 27, because of the diffusion therein of hydrogen coming from the same tank 39, under effect of the pump 56, because of the presence of the pilot igniter 64, with further part of the air and more exactly with the oxygen of further part thereof. The second chamber 27 now contains a mixture of air, further depleted of oxygen and overheated steam, both at the same pressure, substantially between 10 and 30 atmospheres, preferably 20 atmospheres. It is to be noted that, while passing through the heat exchanger 33, the liquid air undergoes a starting gasification by extracting heat from the ambient atmosphere. Condensation and any freeze are thus effectively prevented.

Likewise the liquid hydrogen undergoes a starting gasification on passing through the heat exchanger 44 and on passing through the heat exchanger 58.

Thanks to the heat exchangers 33, 44, 58, which preliminarily perform a starting gasification of the liquid air as well as of the liquid hydrogen by extracting heat from the ambient atmosphere, the energy to be transmitted to the liquid air and to the hydrogen in order to gasify the liquid air, thanks to the combustion of the hydrogen with the oxygen of the air itself, is thus reduced.

It should be noted that, thanks to the settable accumulators 38, 49, 63, a stabilisation of possible pulses of the pressure values inside the gasification chamber 22 is achieved.

The gas mixture released by gasifying liquid air, which is in practice compressed air, passes to the intake manifold 16 through the port 23 and from here, through the intake valve 12 which is open each time, into the chamber 9 of the respective cylinder 5. Here, because of its pressure, it expands by shifting the piston 6 along its active stroke in the direction of arrow $F_1$, thus performing the desired mechanical work.

It is to be noted that, thanks to the fluid communication with the gasification chamber 22, the entire gas mixture, which comprises compressed liquid gas and gaseous products and by-products of combustion process, passes into the expansion chamber 9 of the engine 3. During the exhaust stroke in the direction of arrow $F_2$, the piston ejects the gas mixture through the exhaust valve 13, the mixture being now at ambient pressure, into the exhaust manifold 17, and here from into the ambient atmosphere, almost at ambient pressure and temperature.

At this point the operation is repeated, with each piston completing a power and an exhaust stroke at each double stroke.

With reference to FIG. 2, the working cycle of the engine unit according to the invention is now described. In particular in a diagram with the cylinder pressure p plotted along the ordinate axis and the cylinder swept volume V along the abscissa axis. $V_c$ is the product of the piston stroke c for its section F, whereas $V_o$ is the minimum volume in the cylinder, also called dead space, when the piston is at its top dead centre.

$P_2$ is the highest pressure inside the cylinder, and $p_1$ is the lowest pressure, the latter being approximately the same as the ambient pressure.

From A to C via B the working stroke (arrow $F_1$) of the piston f is achieved with expansion of the compressed air. From C to A via D the piston exhaust stroke (arrow $F_2$) is achieved with expulsion of the exhaust air.

From A to B, the intake valve 12 is open and the piston is pushed by a constant pressure. From B to C, the intake valve 12 is closed and the cylinder is pushed by gas expansion, until the exhaust valve 13 is opened under conditions of pressure $p_1$ approximately equal to ambient pressure.

From C to D, the cylinder is emptied of the spent gas, which is discharged in the ambient atmosphere.

From D to A the valve 13 is closed and a pressure increase occurs within the cylinder until the pressure value $p_2$ is reached, being equal to that of the gasification chamber.

It should be noted that the duration AB for opening the intake valve 12 is selected so that the gas mixture, at the end of the piston power stroke, has substantially attained substantially ambient pressure and temperature.

It is to be noted that the duration CD for opening the exhaust valve 13 is selected so that, at the end of the piston exhaust stroke, when the intake valve 12 has to open, the same pressure as in the gasification chamber prevails in the cylinder.

According to an alternative embodiment, instead of proper liquid air, liquid air depleted of oxygen is used as liquid gas. The air depleted of oxygen is substantially made of nitrogen as main component and of a reduced amount of oxygen. The latter corresponds in practice to the amount of oxygen necessary for the combustion reaction with the fuel, e.g. a stoichiometric amount.

The operation of the engine unit 1 with the liquid air depleted of oxygen is similar to the above described. In this case there is however the advantage of not uselessly wasting oxygen and of thus using the oxygen extracted from the air for other purposes. In order to separate the oxygen from air any known technology for separating gas can be used.

Figure 3:
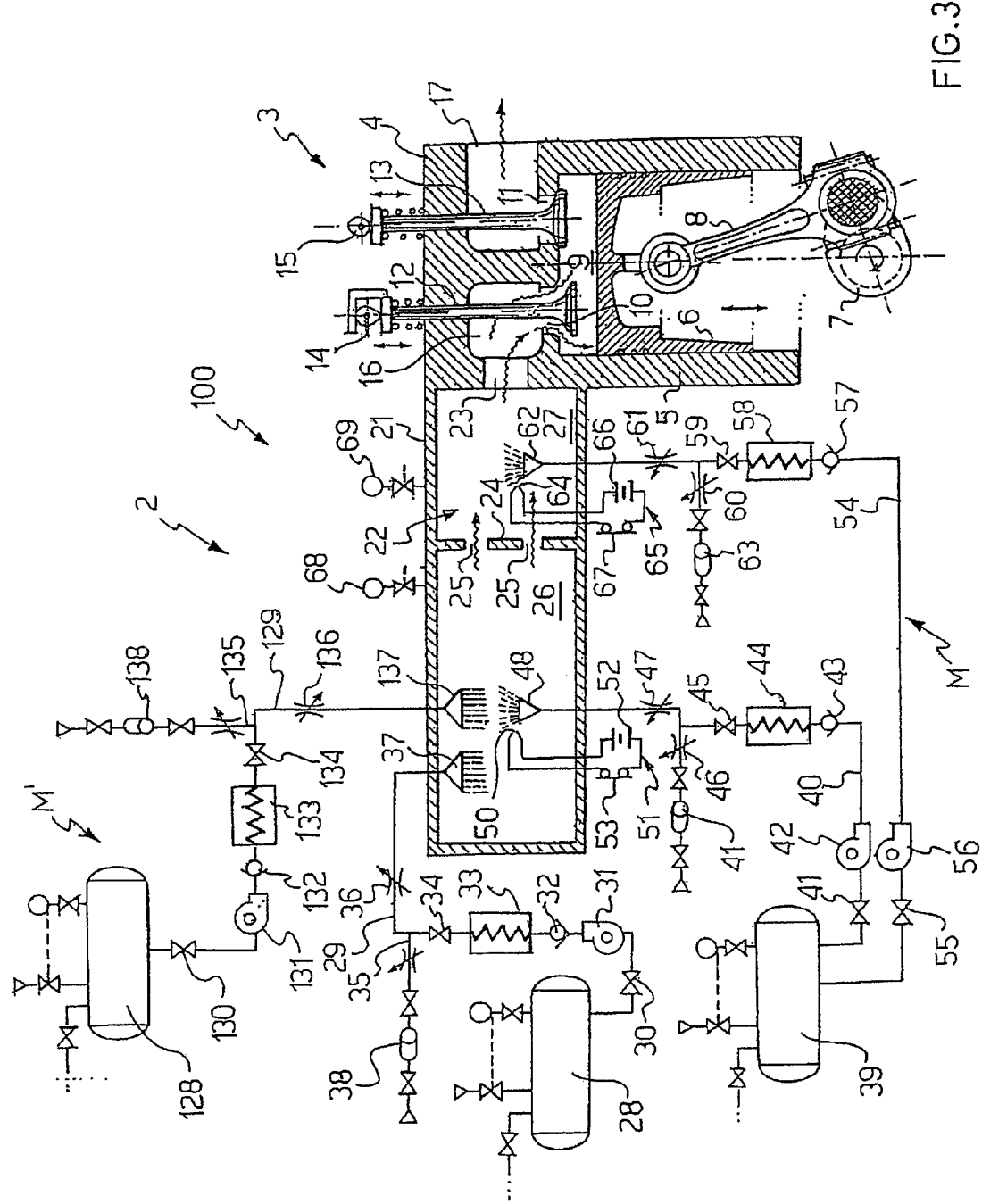
FIG. 3 shows a schematic view of a first embodiment of the engine unit of FIG. 1.
Figure 4:
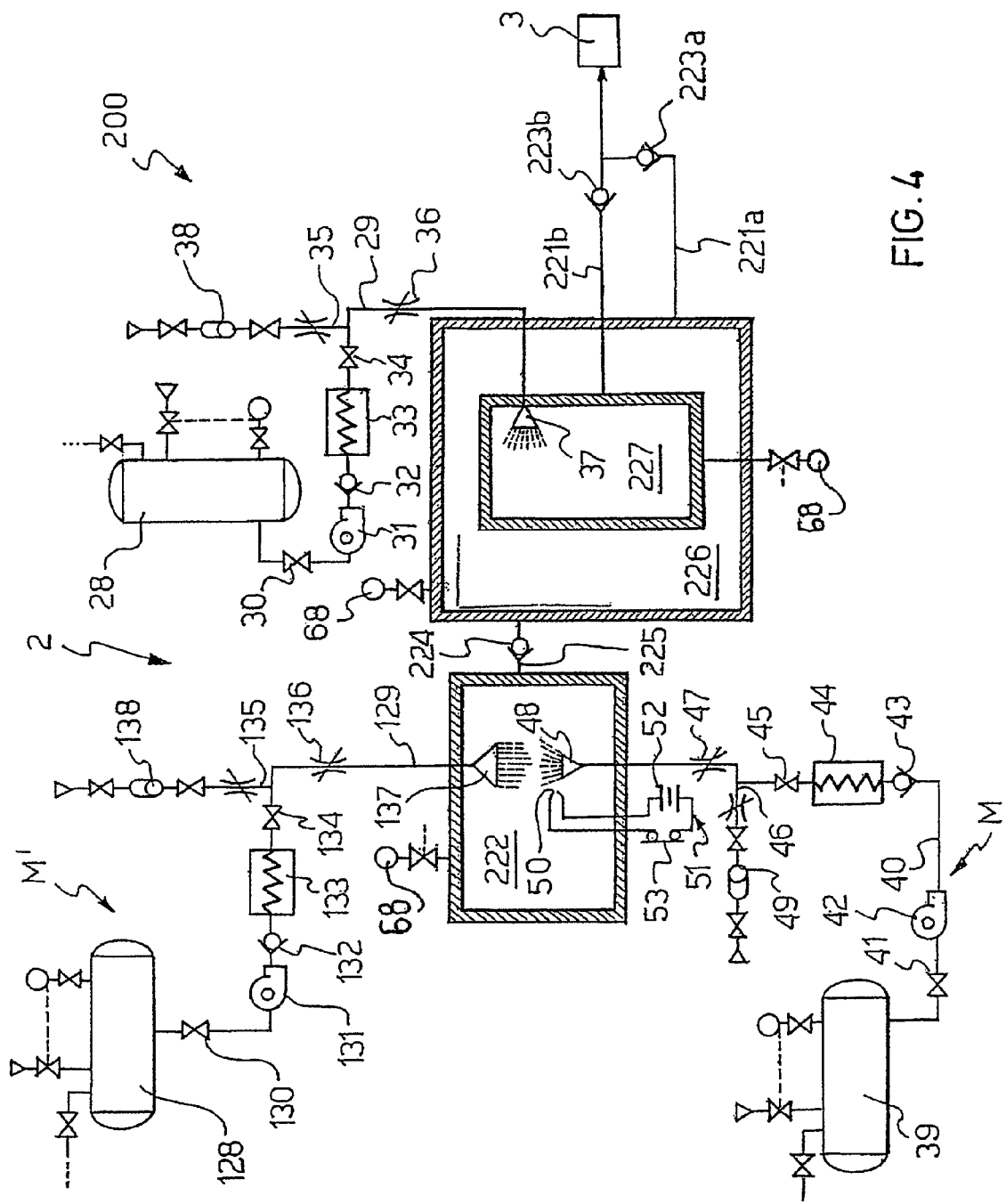
FIG. 4 shows a schematic view of a second embodiment of the engine unit of FIG. 1.
Figure 5:
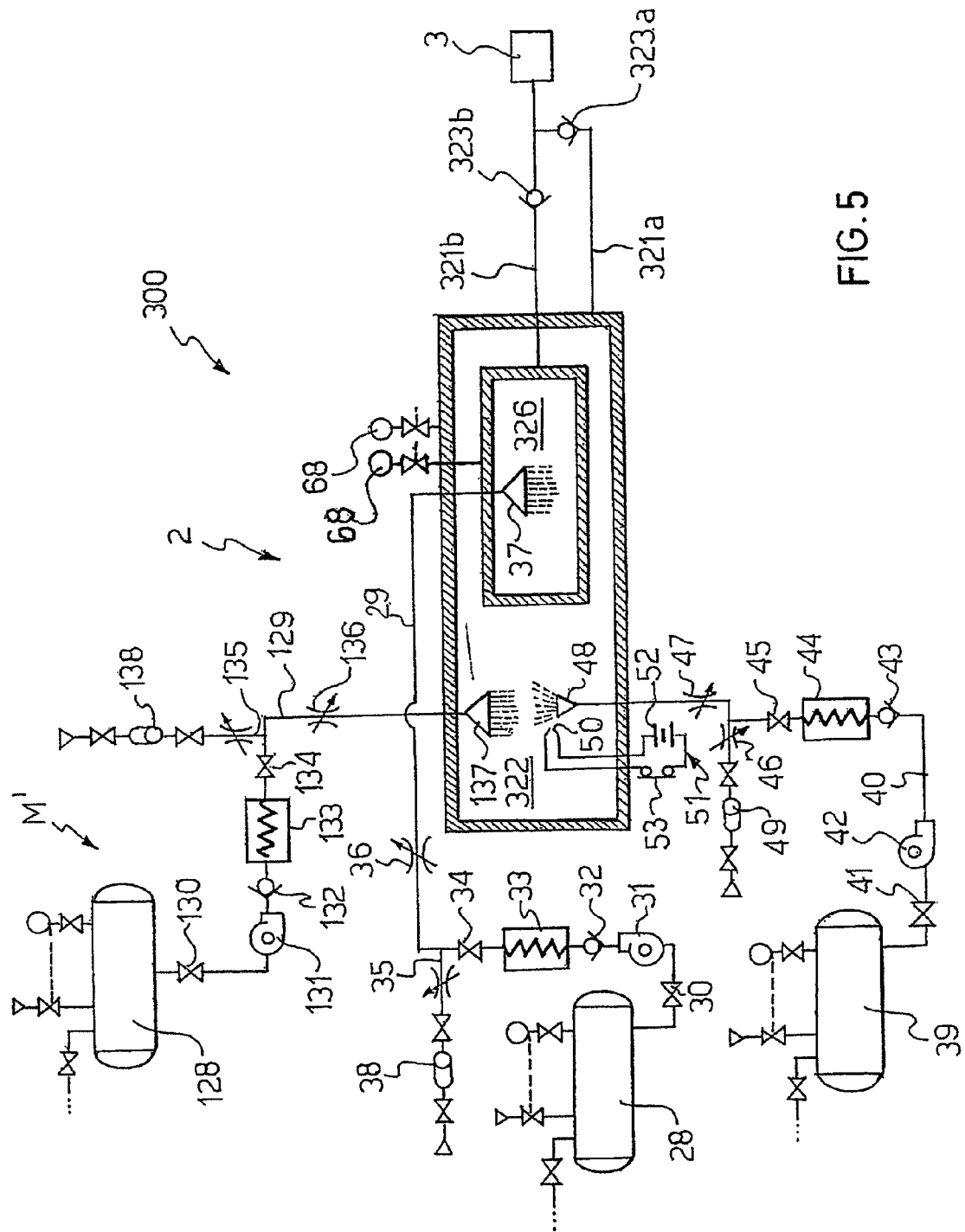
FIG. 5 shows a schematic view of a third embodiment of the engine unit of FIG. 1.

With reference to FIGS. 3, 4 and 5 other embodiments of the engine unit are shown, respectively 100, 200 and 300, according to the present invention. In these figures, equal components having the same function already described, keep the same reference number. Thus these common components are not described again in detail.

These embodiments substantially differ from the preceding one only as regards the method for gasifying the liquid gas, whereas the motor 3 is driven according to the same mode already described.

In particular, FIG. 3 shows an engine unit 100, wherein liquid nitrogen is used as liquid gas. The tank 28 is constituted of a cryogenic cylinder of liquid nitrogen, substantially pure. The nitrogen is supplied to the gasification chamber 22 through the same path and mode shown in FIG. 1 for the liquid air.

Similarly to what has been already shown in FIG. 1, in the gasification chamber 22 the fuel of the tank 39 is also supplied through the pipings 40 and 54.

In order to allow fuel combustion, the engine unit 100 comprises gasifying means M', which include a liquid oxygen tank 128, independent from that of liquid nitrogen. The liquid oxygen tank 128 is in practice constituted of a cryogenic cylinder of liquid oxygen.

In particular, the gasification chamber 22, and precisely the first chamber 26, is connected to the liquid oxygen tank 128 through a piping 129. Along the piping 129, starting from the tank 128, a cutoff valve 130, a pump 131, a check valve 132, a heat exchanger 133, a cutoff valve 134, a branch line 135, and a flow control valve 136 are arranged, and finally a diffuser 137 open in the first chamber 26 is arranged facing the liquid hydrogen diffuser 48. The branch line 135 is provided with a settable accumulator 138.

The accumulator 138 is conventional and it is equipped with fin and cutoff valve and a throttle.

Also the tank 128 is conventional and it is equipped with vent, fill valve and manometer, with respective cutoff valves.

During operation of the engine unit 100, nitrogen, oxygen and liquid hydrogen from respective tanks 28, 128 and 39 are introduced into the gasification chamber 22 and precisely into the first chamber 26. In particular, the oxygen and the hydrogen are diffused and contacted with each other, under effect of the respective pumps 131 and 42.

Thanks to the pilot igniter 50, the combustion of hydrogen with oxygen is performed, which takes place as in the preceding case. The amount of oxygen introduced is suitably calibrated for obtaining a partial consumption of oxygen in the first chamber 26, and a total consumption in the second chamber 27.

The combustion heat causes the gasification of the liquid nitrogen for obtaining compressed nitrogen.

It is to be noted that also in this case the liquid nitrogen, while passing through the heat exchanger 33 undergoes a starting gasification by extracting thermal energy from the ambient atmosphere.

Similarly also the liquid oxygen on passing through the heat exchanger 133 undergoes a starting gasification by extracting thermal energy from the ambient atmosphere.

With reference to FIGS. 4 and 5, respectively engine unit 200 and 300 are shown, which differ from the preceding ones because the combustion between oxygen and hydrogen is carried out in a separated area with respect to the gasification of liquid gas.

Both in FIG. 4 and 5, the engine 3 is represented in a symbolic way, since its operation is the same as the one already described in FIG. 1.

In particular, the engine unit 200 (FIG. 4) comprises a first gasification chamber 222 and a thermal exchange chamber 226 in fluid communication with each other through a piping 225, and where between a check valve 224 is interposed.

The engine unit 200 further comprises a second gasification chamber 227, which is located inside the thermal exchange chamber 226, and which is distinct and separated from both the first gasification chamber 222 and the second gasification chamber 227.

In particular, the second gasification chamber 227 is equipped with thermally conductive walls for exchanging heat with the thermal exchange chamber 226.

It is to be noted that the second gasification chamber 227 is represented for simplicity sake in a rectangular shape. It is clear that it can have any other shape suitable for ensuring a high thermal exchange surface; e.g. it can be coil shaped, or it can be equipped with a plurality of wings on its outer surface.

The second gasification chamber 227 is connected to the liquid nitrogen tank 28 through the piping 29 and the further elements already described in FIG. 3. In particular, the liquid nitrogen is introduced into the second gasification chamber 227 after having undergone a starting gasification by means of the heat exchanger 33.

The first gasification chamber 222 is connected with the liquid oxygen tank 128 and respectively with the liquid hydrogen tank 39, through the same pipings 129 and 40 and the further elements described in the preceding case of FIG. 3.

Moreover, both the first gasification chamber 222, the thermal exchange chamber 226 and the second gasification chamber 227 are equipped with a relative safe vent valve.

The engine 3 is connected with the thermal exchange chamber 226 through a first piping 221a equipped with a first check valve 223a and with the second gasification chamber 227 through a second piping 221b equipped with a second check valve 223b.

In such a manner, also in this case, both first and second gasification chambers 222 and 227 are in fluid communication with the expansion chamber 9 of the engine 3.

During operation of the engine unit 200, the oxygen and hydrogen are diffused and contacted with each other inside the first gasification chamber 222, under effect of the respective pumps 131 and 42. The two gases are burnt by means of the pilot igniter 50. The over-heated steam produced by combustion is introduced into the thermal exchange chamber 226 for conveying heat to the second gasification chamber 227, where there is the partially gasified nitrogen.

As effect of the combustion heat, the partially gasified liquid nitrogen is completely gasified in the second gasification chamber 227 for obtaining compressed nitrogen. The latter is united, downstream the second gasification chamber 227, to the combustion products from the thermal exchange chamber 226, for driving the engine 3.

As a result, all the available gases are used in the expansion chamber 9 to do useful work.

In the embodiment shown in FIG. 5, the engine unit 300 comprises a first gasification chamber 322 and a second gasification chamber 326 inserted in the first gasification chamber 322 itself and distinct from the latter.

In particular, the second gasification chamber 326 is equipped with thermally conductive walls for exchanging heat with the first gasification chamber 322.

The first gasification chamber 322 is connected with the liquid oxygen tank 128 and with the liquid hydrogen tank 39 through pipings 129 and 40 respectively, as in the preceding case of FIG. 4.

The second gasification chamber 326 is connected with the liquid nitrogen tank 28 through the piping 29, as in the preceding case of FIG. 4. The liquid nitrogen instead is introduced into the second gasification chamber 326 as partially compressed through the heat exchanger 33.

Moreover, both the first gasification chamber 322 and the second gasification chamber 326 are equipped with a respective safe vent valve.

The engine 3 is connected with the first gasification chamber 322 through a first piping 321a equipped with a first check valve 323a, and with the second gasification chamber 326 through a second piping 321b equipped with a second check valve 323b.

In such a manner, also in this case, both first and second gasification chambers 322 and 326 are in fluid communication with the expansion chamber 9 of the engine 3.

During the operation of the engine unit 300, the oxygen and the hydrogen are diffused and directly contacted inside the first gasification chamber 322 by the respective diffusers 137 and 48 for being burnt by driving the pilot igniter 50.

The heat produced by the combustion is directly conveyed to the second gasification chamber 326 for completely gasifying the nitrogen therein obtaining compressed nitrogen. This latter is united, downstream the second gasification chamber 326, to the combustion products from the first gasification chamber 322 for driving the engine 3.

As a result, all the available gases are used in the expansion chamber 9 to do useful work.

The main advantage of the engine units 200 and 300 is that the combustion and gasification processes take place in separate areas. This allows to avoid direct contact of the oxygen and the nitrogen during the combustion process, thus preventing possible formation of nitrogen oxides in the thermal exchange chamber 226 and in the second gasification chambers 227 and 326, because of the above high pressure conditions.

The present invention also relates to a method to supply an engine and a generator for carrying out the method.

According to the invention, the method comprises the steps of providing a liquid gas, oxygen, preferably liquid, and a fuel, preferably liquid and preferably liquid hydrogen, of gasifying the liquid gas by burning the hydrogen with the oxygen, with the presence of a pilot igniter, thus obtaining compressed gas at a pressure of approximately 10 to 30 atmospheres and preferably 20 atmospheres and of supplying the engine with compressed gas thus obtained and with gaseous product and by-product of the combustion process. According to the method, a starting gasification is performed by thermal energy extracted from the ambient atmosphere through a heat exchanger.

In a particular solution, the method according to the invention provides to use liquid air as liquid gas. In this case, being the oxygen part of the air, it has not to be autonomously supplied.

In other solutions, the method according to the invention provides to use liquid nitrogen as liquid gas and, as a consequence, the oxygen is supplied by an autonomous tank.

For further clarity, the overall energetic balance of the engine unit according to the invention is hereafter shown.

The atmosphere is the means that carries the energy dispersed in the ambient atmosphere during the step of producing liquid air to the user who extracts this energy from the ambient atmosphere thanks to the great temperature gap (between the liquid air temperature ($\sim$ $-190°$ C.) and the ambient temperature) and makes it available for the engine unit to get the motion energy of the vehicle.

The use of liquid air allows to address the energy obtainable from systems such as nuclear systems, hydroelectric systems, eolic and traditional fuel ones, photovoltaic, . . . to the production of a corresponding amount of liquid air. And this liquid air can be then placed on a vehicle that, by using the engine unit according to the invention allows to use again, except from frictions, the energy used for producing this liquid air as motion energy of the vehicle. So, for example, any electrical connection with the electrical energy supplier is excluded, as it happens instead for example in the overhead trolley wires.

If the production of liquid air and the overall users employing it are considered, it is noted that, for the energy balance, the amount of energy necessary to make the ambient air liquid air, except from the frictions of the engine unit according to the invention, is equal to the amount of energy the liquid air must receive from the ambient atmosphere and transform it into motion energy available to the vehicle, so that the air is given back in the same state to the ambient atmosphere wherefrom it had been extracted.

The main advantage of the engine unit according to the invention is its non-polluting operation: in fact the required power practically comes from the expansion of compressed gas achieved by gasifying liquid gas in a combustion process.

This is obtained in advance in various known ways, in industrial places far from inhabited centres. As for its gasification for obtaining compressed gas, first the heat exchanger extracts energy from the ambient atmosphere and then there is combustion of a very small quantity of fuel.

The above main advantage is to be combined with the further advantage that all the gases, i.e. gases obtained by gasifying liquid gas and gaseous products and by-products of the combustion process, are used in the expansion chamber to do useful work.

It is then to be noted that in the preferred embodiment wherein liquid hydrogen is used as fuel, no carbon- pollutant is released. In addition, because of particularly favourable temperatures, pollutants deriving from nitrogen oxidation are totally absent.

A particularly silent operation is also to be expected thanks to the fact that both the intake and exhaust valves are under equal pressure conditions, downstream and upstream, when they open.

A further advantage of the engine unit of the invention is its autonomy, not lower than the one required for urban transport.

A further advantage of the engine unit of the invention is its higher intrinsic safety reached because of the dramatically reduced amount of fuel required for its operation.

A further advantage of the invention unit is that it can be manufactured by using in practice existing engines, both very commonly used piston engines with connecting-rods and cranks or, in case, of the Wanckel type with very poor changes.

Obviously a skilled in the art can apply several modifications and variations to the engine unit, to the method and to the generator above-described, in order to satisfy occasional and specific needs, all of them included in the scope of the invention, as defined in the following claims.

The invention claimed is:

1. An engine unit, particularly for urban transport, comprising:
   an engine supplied with a compressed gas and having an expansion chamber provided with a cylinder and piston arranged for completing cyclically a power and an exhaust stroke at each double stroke;
   a liquid gas tank in communication with the engine;
   a liquid fuel tank;
   means for gasifying the liquid gas, which are interposed between the liquid gas tank and the engine for obtaining compressed gas, the gasifying means comprising a heat exchanger for a starting gasification of the liquid gas in communication with the liquid gas tank;

a close housing wherein a gasification chamber is formed, the gasification chamber being in fluid communication with both the liquid fuel tank and the heat exchanger for the combustion of the liquid fuel with the oxygen of the compressed gas, the gasification chamber being further in fluid communication with the expansion chamber through a port so that the entire gas mixture comprising compressed liquid gas, gaseous products and by-products of combustion process passes into the expansion chamber to do useful works;

an intake manifold and an intake duct placed between the port of the gasification chamber and the expansion chamber, wherein the intake duct puts the expansion chamber in communication with the intake manifold through a respective intake valve; and controlling means provided for opening said intake valve for a first duration in such a way that the piston of the engine is pushed by a constant pressure of the gas from the gasification chamber, and for closing said intake valve for a second duration in such a way the piston of the engine is pushed by gas expansion, wherein the gasification chamber is split into a first gasification chamber and a second gasification chamber for combustion of the liquid fuel with the oxygen under conditions of saturated steam and overheated steam respectively, each of said first and second gasification chambers comprising a respective pilot igniter.

2. An engine unit according to claim 1, wherein the first duration for opening the intake valve is selected so that the gas mixture, at the end of the piston power stroke, has substantially attained ambient pressure and temperature.

3. An engine unit according to claim 1, wherein said expansion chamber is provided with an exhaust valve and wherein controlling means are provided for opening said exhaust valve in such a way that the cylinder is emptied of the spent gas, which is discharged in the ambient atmosphere, and for closing said exhaust valve so as a pressure increase occurs within the cylinder until a pressure value is reached, being equal to that of the gasification chamber.

4. An engine unit according to claim 1, wherein the liquid gas is of liquid air or of air depleted of oxygen.

5. An engine unit according to claim 1, wherein the liquid gas is liquid nitrogen.

6. An engine unit according to claim 5, wherein the gasifying means comprise an oxygen tank in communication with the gasification chamber for combustion of the liquid fuel.

7. An engine unit according to claim 1, wherein the liquid fuel is liquid hydrogen.

8. An engine unit according to claim 1, wherein the gasifying means comprise a pump between the liquid gas tank and the gasification chamber.

9. An engine unit according to claim 1, further comprising a pump between the liquid fuel tank and the gasification chamber.

10. An engine unit according to claim 6, further comprising a pump between the oxygen tank and the gasification chamber.

11. An engine unit according to claim 8, wherein the pump is a variable delivery pump used for controlling the engine speed.

12. An engine unit according to claim 1, further comprising a heat exchanger between the liquid fuel tank and the gasification chamber for a starting gasification of the liquid fuel.

13. An engine unit according to claim 1, wherein the first gasification chamber is in fluid communication with an oxygen tank and with the fuel tank, and wherein the second gasification chamber is in fluid communication with the liquid gas tank, the first gasification chamber and the second gasification chamber being under thermal exchange condition for exchanging the combustion heat produced between the oxygen and the fuel.

14. An engine unit according to claim 13, wherein the first gasification chamber and the second gasification chamber arc in fluid communication through a thermal exchange chamber.

15. An engine unit according to claim 13, wherein the second gasification chamber is directly inserted inside the first gasification chamber.

16. A method for supplying with a compressed gas an engine particularly for urban traction and having an expansion chamber provided with a cylinder and a piston arranged for completing cyclically a power and an exhaust at each double stroke, the method comprising the following steps of gasifying a liquid gas thus obtaining compressed gas;

extracting heat from the ambient atmosphere with a heat exchanger to achieve a starting gasification of the liquid gas;

combusting, in a close housing in which a gasification chamber is formed, a predetermined limited amount of a liquid fuel and oxygen contained in the liquid gas, to achieve a further gasification, wherein combustion is performed in the same close area where the further gasification of the liquid gas takes place, the combustion heat being conveyed into the gasification area, the combustion taking place in the presence of a pilot igniter; and supplying the engine with the entire gaseous mixture comprising the compressed gas and with gaseous products of combustion process, wherein the compressed gas and gaseous products of combustion process pass through an intake manifold through a port of the gasification chamber and, from here, through an intake valve into the expansion chamber, and wherein a working stroke of the piston is achieved by opening the intake valve for a first duration and pushing the piston at a constant pressure, and by closing the intake valve for a second duration and pushing the piston by gas expansion.

17. A method according to claim 16, wherein the liquid gas is of proper liquid air or liquid air depleted of oxygen, and wherein the combustion is performed with oxygen of the liquid air.

18. A method according to claim 16, wherein the liquid gas is of nitrogen and wherein the combustion is performed with oxygen autonomously supplied with respect to the liquid gas.

19. A method according to claim 16, wherein the liquid fuel is liquid hydrogen.

20. A method according to claim 16, wherein the predetermined limited amount of the liquid fuel is selected to obtain compressed gas at a predetermined pressure comprised between 10 and 30 atmospheres.

21. A method according to claim 16, wherein an exhaust stroke of the piston is achieved by opening an exhaust valve until the cylinder is emptied of the spent gas, which is discharged in the ambient atmosphere and by closing the exhaust valve until a pressure value is reached, being equal to that of the gasification chamber.

22. A method according to claim 20, wherein the predetermined pressure of the compressed gas is 20 atmospheres.

* * * * *